UNITED STATES PATENT OFFICE.

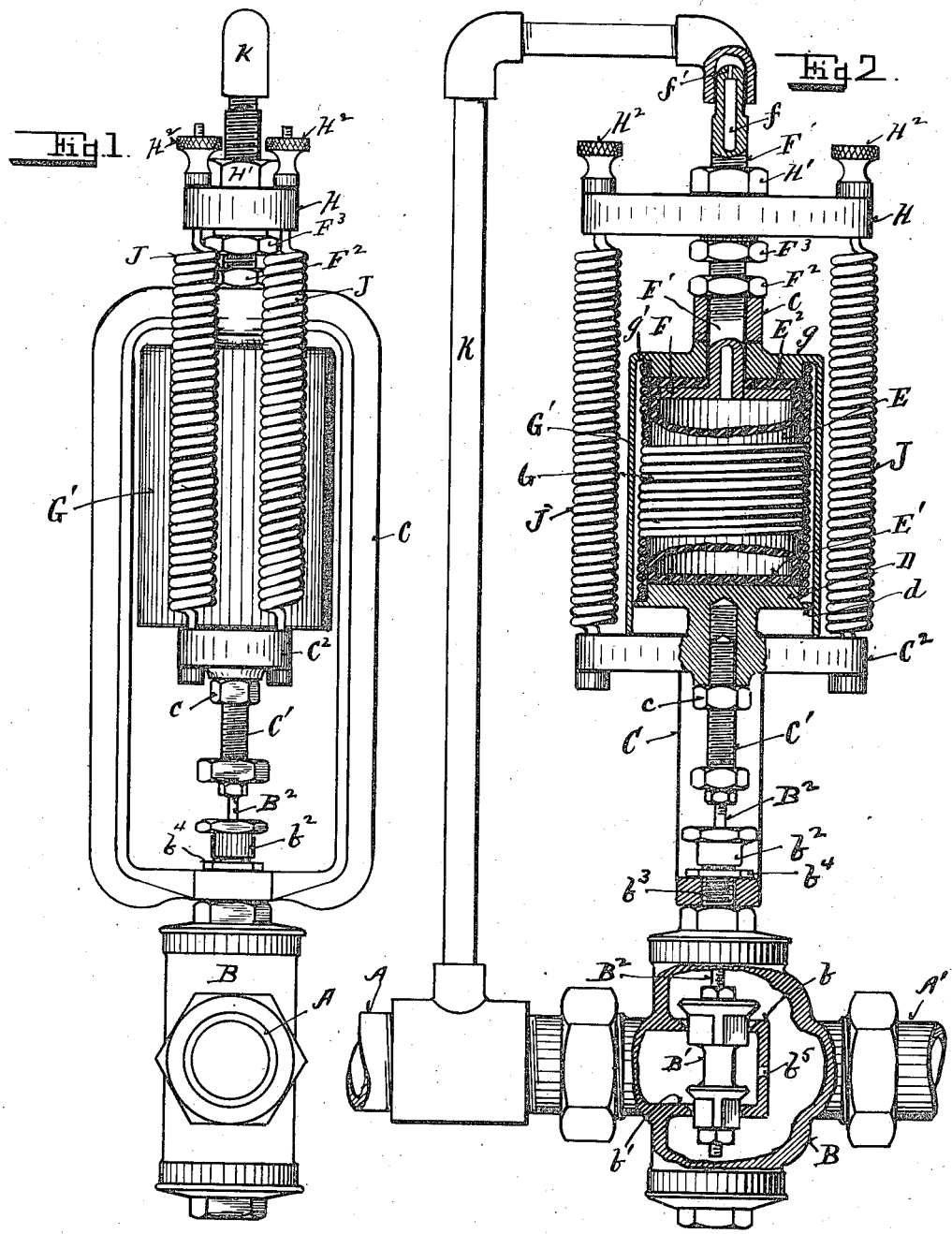

THOMAS M. WILKINS, OF EAST RANDOLPH, NEW YORK.

AUTOMATIC PRESSURE-REGULATOR.

1,199,847.  Specification of Letters Patent.  Patented Oct. 3, 1916.

Application filed February 15, 1915. Serial No. 8,235.

*To all whom it may concern:*

Be it known that I, THOMAS M. WILKINS, a citizen of the United States, residing at East Randolph, in the county of Cattaraugus and State of New York, have invented certain new and useful Improvements in Automatic Pressure-Regulators; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

My invention relates to automatic pressure regulators, and the object thereof is to provide such a mechanism which is adapted to be operated by variations of pressure in a fluid supply pipe leading from a suitable source of supply, (not shown) to a fluid actuated motor, or by fluid pressure in a tank.

The features of my invention are hereinafter fully explained and pointed out, and are illustrated in the accompanying drawings, in which:—

Figure 1, is a view in elevation, of pressure regulating mechanism embodying my invention. Fig. 2, is a side view of the same, partially in section.

In these drawings A—A', indicates a steam line from a steam boiler (not shown) to a steam motor.

B, indicates a valve mechanism in said steam-line A—A', having therein a valve B', which is adapted to seat upon valve-seats $b$—$b'$. From the valve B', a stem $B^2$ extends upward through a stuffing-box $b^2$. Upon the valve housing B, I secure a yoke C, by means of a screw threaded neck $b^3$, which enters an opening in the lower end of the yoke C, and I place on said neck $b^3$, a nut $b^4$, to securely fasten the yoke C, to the valve-housing B. The upper end of the valve-stem is secured to an adjusting-screw C', which is screwed into a cross-bar, $C^2$, and is provided with a lock-nut $c$, to prevent said screw from accidentally moving in the bar $C^2$. Integral with the bar $C^2$, I provide a disk D, having a flange $d$, thereon.

In a cylinder of rubber E, or other elastic material, having one end E', entirely closed and the other end $E^2$, provided with a central opening, I insert the head plate F, of a metallic stem F', which is provided with a longitudinal opening $f$, therethrough, and with an external screw thread. Around the rubber cylinder E, I place a closely wound wire spring G, the ends of which project slightly beyond the ends of the rubber cylinder E. I next place over the rubber cylinder E, and spring G, thereon a metallic cylinder G', the upper or closed end $g$, having an opening therethrough to receive the stem F' and being preferably provided with an internal annular groove $g'$, to receive the upper end of the spring G, thereinto; the lower end of the spring G, resting upon the flange $d$, on the disk D. The lower or open end of the cylinder G', is open and extends downwardly over the flange $d$, and normally contacts with the bar $C^2$. The stem F', extends upwardly through the upper end of the yoke C, and is provided with a nut $F^2$, by means of which the head-plate F, cylinder end $g$, and yoke C, are bound firmly together, thereby clamping the end $E^2$, of the rubber cylinder E, firmly between the disk F, and cylinder end $g$. Upon the stem F', above the nut $F^2$, I place a nut $F^3$; and upon the stem above the nut $F^3$, I place a cross-bar H, which is clamped down upon the nut $F^3$, by a nut H'. Between the ends of the cross-bars $C^2$, and H, I secure springs J; preferably a pair of springs J, being secured in each end of said cross-bars. I have shown the lower ends of the springs J, as being non-adjustably secured in the cross-bar $C^2$ and the upper ends of said springs being adjustably secured in the cross-bar H, by means of the thumb-nuts $H^2$. The longitudinal opening $f$, in the stem F', at its upper end, is reduced to a pin-hole $f'$. From the upper end of the stem F' a pipe K, leads to the steam-pipe A.

In operation the valve B', is normally raised off of the seats $b$—$b'$, and the rubber cylinder E, and spring G, compressed as shown in Fig. 2, by the action of the springs J, so that steam from the steam generator (not shown) passes freely through the valve-housing B, into the pipe A', and thence to the steam motor (not shown) which is driven therefrom. When, however, the liquid pressure has been raised by the operation of the motor to the point at which the regulator is adjusted to act, the pressure is communicated to the interior of the rubber cylinder E, thereby forcing downward the disk D, and through the valve stem $B^2$, causing a closing movement of the valve B'. During the downward movement of the disk D, the rubber cylinder E, is caused to elongate, the spring G, being elongated therewith, while at the same time preventing any radial movement of the sides of the cylinder. This closing of the valve B, stops or decreases the flow of steam therethrough to the motor, and consequently retards the accumulation of pressure. The valve-housing B, is preferably provided with a steam passage $b^5$, through which a minimum amount of steam is allowed to flow, so that the motor, while being slowed down by the closing of the valve B', will not entirely stop.

Having thus fully described the construction and operation of mechanism embodying my invention, what I claim as new and desire to secure by Letters Patent, is:—

1. The combination in a device of the class described, of a fluid supply pipe, a valve thereon, a stem on said valve, a valve housing, a yoke secured on said housing and extending upwardly therefrom, a cross-bar supported upon said yoke, an inverted cylindrical cup supported by said yoke, above and concentric with said valve-stem, a longitudinally elastic cylinder closed at its lower end hermetically secured against the closed upper end of said inverted cup, a disk vertically movable within the lower end of said inverted cup engaging the closed lower end of said elastic cylinder, a cross-bar secured to said disk, springs adjustably secured between the ends of the said cross-bars and adapted to normally maintain the last named cross-bar against the lower or open end of said inverted cup, longitudinally adjustable means connecting said lower cross-bar and said valve-stem, and a tubular connection from said supply-pipe into said elastic cylinder.

2. In a device of the character described, a fluid supply pipe, a valve therein, a housing for said valve, a yoke secured on said housing, a valve stem extending from said valve into said yoke, a disk secured on said valve-stem, means to adjust said valve-stem longitudinally with relation to said disk, a longitudinally elastic fluid-receiving cylinder on said disk, a metallic disk over the upper end of said cylinder, a hollow screw-threaded stem communicating with the interior of said cylinder and extending through said yoke, a nut on said stem to clamp said cylinder and upper disk to said yoke, a cross-bar on said hollow-stem, means to adjust the same vertically thereon, a cross-bar connected with said valve-stem, springs secured between said cross-bars and a tubular connection between said hollow stem and a source of fluid-supply, substantially as set forth.

3. In a device of the character described, a fluid supply pipe, a valve therein, a housing for said valve, a valve-stem extending upward through said housing, a disk on said valve-stem, a yoke secured on said valve-housing, a longitudinally elastic fluid-receiving cylinder between said yoke and disk, spring mechanism supported by said yoke and connected with said valve-stem to normally retain said valve in an open position, a hollow stem communicating with said cylinder, having a restricted opening in one end thereof, and a tubular connection between said hollow stem and said supply pipe, substantially as set forth.

In testimony whereof I affix my signature in presence of two witnesses.

THOMAS M. WILKINS.

Witnesses:
H. M. STURGEON,
J. R. WIMMER.